(12) United States Patent
Sostawa et al.

(10) Patent No.: US 7,936,816 B2
(45) Date of Patent: *May 3, 2011

(54) DIGITAL TRANSCODING SYSTEM (75) Inventors: Bernd Sostawa, Herrenberg (DE); Thomas Dannemann, Kornwestheim (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1234 days.

This patent is subject to a terminal disclaimer.

(21) Appl. No.: 11/519,461

(22) Filed: Sep. 11, 2006

(65) Prior Publication Data

US 2007/0116116 A1 May 24, 2007

(51) Int. Cl.
*H04N 7/12* (2006.01)
*G06K 9/36* (2006.01)

(52) U.S. Cl. .................................. 375/240.03; 382/239

(58) Field of Classification Search ............. 375/240.03, 375/240.3, 240.24; 370/477; 341/50
See application file for complete search history.

(56) References Cited

U.S. PATENT DOCUMENTS

| | | | |
|---|---|---|---|
| 5,537,440 A | 7/1996 | Eyuboglu et al. | |
| 5,541,852 A | 7/1996 | Eyuboglu et al. | |
| 5,570,197 A | 10/1996 | Boon | |
| 5,657,015 A | 8/1997 | Nakajima et al. | |
| 5,754,235 A | 5/1998 | Urano et al. | |
| 5,870,146 A * | 2/1999 | Zhu .......................... | 375/240.03 |
| 5,940,130 A | 8/1999 | Nilsson et al. | |
| 6,208,688 B1 | 3/2001 | Seo et al. | |
| 6,215,425 B1 | 4/2001 | Andrews et al. | |
| 6,226,328 B1 | 5/2001 | Assuncao | |
| 6,259,741 B1 | 7/2001 | Chen et al. | |
| 6,278,735 B1 | 8/2001 | Mohsenian | |
| 6,310,915 B1 | 10/2001 | Wells et al. | |
| 6,441,754 B1 * | 8/2002 | Wang et al. ..................... | 341/50 |
| 6,466,623 B1 | 10/2002 | Youn et al. | |
| 6,847,656 B1 * | 1/2005 | Wu et al. ........................ | 370/477 |
| 7,106,799 B1 * | 9/2006 | Sostawa et al. .......... | 375/240.24 |

FOREIGN PATENT DOCUMENTS

| | | |
|---|---|---|
| EP | 0 711 079 A2 | 5/1996 |
| JP | 08251587 A | 9/1996 |
| WO | 9625823 | 8/1996 |
| WO | WO 97/49206 | 12/1997 |

(Continued)

OTHER PUBLICATIONS

Björk et al., "Transcoder Architectures for Video Coding," *IEEE Transactions on Consumer Electronics*, vol. 44, No. 1, Feb. 1998, pp. 88-98.

(Continued)

*Primary Examiner* — Gims S Philippe
(74) *Attorney, Agent, or Firm* — O'Shea Getz P.C.

(57) ABSTRACT

A digital transcoder system is presented for receiving data bit streams with a first bit rate (R1) and outputting a data bit stream with a second bit rate (R2) which differs from the first bit rate (R1), and in particular is reduced relative thereto. This transcoder system has a decoder device (10) on its input side and a coder device (20) on its output side, the latter consisting of a series circuit of a quantizer (21) for requantizing the data dequantized in the decoder device (10), with a requantization factor (Q2), also with a subsequent VLC coder (22) and an output buffer (23). Establishing the second bit rate (R2) requires that the requantization factor of the quantizer (21) be changed, with reference to macro-blocks, according to the specification of a certain calculational formula.

16 Claims, 9 Drawing Sheets

FOREIGN PATENT DOCUMENTS

WO      WO 97/49249      12/1997

OTHER PUBLICATIONS

Nakajima et al., "Rate Conversion of MPEG Coded Video by Re-Quantization Process," *Proceedings of International Conference on Image Processing*, Oct. 23-26, 1995, vol. 3, pp. 408-411.

Sun et al., "Architectures for MPEG Compressed Bitstream Scaling," *IEEE Transactions on Circuits and Systems for Video Technology*, vol. 6, No. 2, Apr. 1996, pp. 191-199.

"Practical Considerations in Implementing Variable Rate Coders," *The Bell System Technical Journal*, Mar. 1979, pp. 584-587 and 598-599.

Abstract of: Seo et al., "Efficient Rate Control Algorithm for Fast Transcoding," Proceedings of the SPIE—The International Society for Optical Engineering, vol. 3528, 1999, pp. 249-260.

Keesman et al. "Transcoding of MPEG bitstreams", Signal Processing: Image Communication, Elsevier Science Publishers, Amsterdam, NL, vol. 8, pp. 481-500 (1996).

Wilkinson, J. "Understanding MPEG Concatenation and Transcoding", ABU Technical Review, Asian Broadcasting Union, Kuala Lumpur, MW, No. 177, Jul.-Aug. 1998, pp. 3-9.

Japanese Office Action.

\* cited by examiner

DIGITAL TRANSCODING SYSTEM

BACKGROUND OF THE INVENTION

The present invention relates to digital video transcoding systems and methods.

Digital transcoding systems are necessary wherever the bit rate of a data bit stream is converted, for example so the data bit stream can be transmitted via a bandwidth-limited transmission channel. Examples of transcoding are described in the published applications WO 97/49206 and DE 196 23 934 A1. Other publications on this subject are found in IEEE Transactions on Consumer Electronics, Vol. 44, No. 1, February 1998, pages 88 to 98 in the article "*Transcoder Architectures for Video Coding*" and in IEEE International Conference on Imaging Processing, Vol. 3, 1995, pages 408 to 411, in the article "*Rate Conversion of MPEG Coded Video by Requantization Process*".

A main field of application for digital transcoding is the processing of video bit streams. For example, on a DVD video the bit streams are stored in accordance with the MPEG-2 video coding standard. The bit rate of these bit streams can be as high as e.g., 9.8 Mbit/s, and the bit-rate can either be constant or variable in time. However, this maximum bit rate is often too high for distribution in certain transmission channels, such as an optical bus in automobiles, since these bus systems are capable of only a limited and generally constant bit rate. Consequently, a DVD can be adapted for application in automobiles only with a digital transcoder, which modifies both the mean bit rate and the bit-rate characteristic of the video bit streams.

Usually, an MPEG program stream stored on the DVD video includes a video bit stream, several audio bit streams, and subtitle and navigation information. The video bit stream is typically compressed and coded in accordance with the video coding standards MPEG-1 or MPEG-2. Since the video coding standard MPEG-2 is generally used, Table 1 shows some characteristics of the MPEG-2 video bit stream on the DVD video.

TABLE 1

DVD video. Some characteristics of the MPEG-2 video bit stream.

| | |
|---|---|
| Video coding standard | MPEG-2, subset of main profile @ main level |
| | MPEG-2, subset of simple profile @ main level |
| Maximum bit rate | 9.8 Mbit/s |
| Bit-rate characteristic | Variable bit rate (VBR), constant bit rate (CBR) |
| Video systems supported | PAL (625/50), NTSC (525/60) |
| Resolution in pixels | PAL: 720 × 576, 352 × 288 |
| | NTSC: 720 × 480, 352 × 240 |
| Picture refresh frequency | PAL: 25 full pictures/s |
| | NTSC: 29.97 full pictures/s |
| Maximum picture group length (group of pictures, GOP) | PAL: 15 full pictures |
| | NTSC: 18 full pictures |

The necessity of adapting DVD technology for application in an automobile becomes apparent if one considers the properties of the optical bus, over which the video bit stream is distributed in the automobile. For transmitting the video bit stream, the optical bus supports a bit rate of only 3 to 4 Mbit/s. The bit rate provided is constant in time, for example the same amount of data is transported during every time interval of the same duration. These two properties of the bus impose requirements on the video bit stream to be transmitted. Therefore, the video bit stream must have a bit rate of only 3 to 4 Mbit/s, and this bit rate must be constant in time. Comparison of these requirements with the entries in Table 1 clearly shows that the video bit stream on the DVD video does not meet these requirements. The mean and maximum bit rates on the DVD video are too high, since the video bit streams can have a bit rate up to 9.8 Mbit/s. Furthermore, the video bit streams on the DVD video can have not only a constant bit rate (CBR) but also a variable one (VBR). Bit streams with a variable bit rate have a bit rate that fluctuates in time, and generally they cannot be transmitted at a constant bit rate. Consequently, the video bit streams on the DVD video must be adapted to the properties of the optical bus in automobiles according to the bit rate level and the bit-rate characteristic. This adaptation is provided by a digital transcoder.

Figure 1:
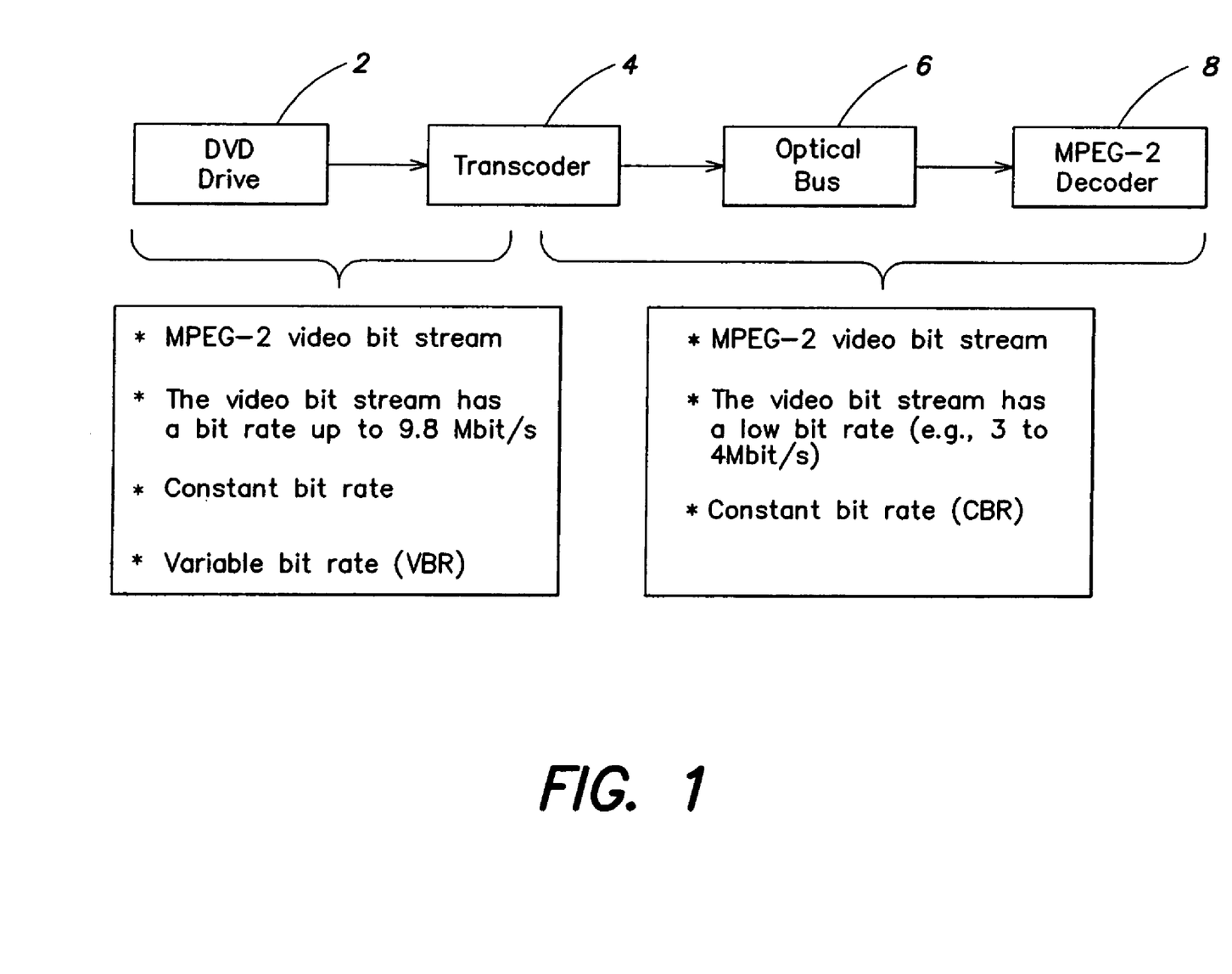
FIG. 1 illustrates a system block diagram for distributing video bit streams over an optical bus in an automobile.

FIG. 1 illustrates a system for distributing video bit streams over an optical bus in an automobile. The digital transcoder appears as the interface between two domains with different properties. The development of a conversion algorithm for the transcoder and the implementation of this algorithm in a video processor platform consequently are the objectives of various development projects.

Two requirements for the transcoder have already been formulated in the previous section and can be read off from FIG. 1. The digital transcoder must reduce the bit rate of the input video bit stream and, where appropriate, must modify the bit-rate characteristic, such that a CBR bit stream with a defined bit rate is present at the output of the transcoder.

The first requirement states that techniques must be found to reduce the data quantity of the input video bit stream. The second requirement is fulfilled by a bit-rate control, which utilizes the techniques found above in such a way that the transcoded video bit stream has the desired constant bit rate.

Besides the above-cited requirements for the functions of the transcoder, there are still other requirements for the manner in which these functions are to be implemented. These additional requirements for the implementation of the functions derive from the intended implementation with a video processor. To simplify the implementation, the transcoding algorithm not only should have minimal complexity but also minimal memory. The delay time caused by the bit-rate control should be as short as possible to reduce the transfer time of the bit streams through the system.

Finally, of course, the picture quality of the transcoded video bit stream must be taken into account, because acceptance of the system decisively depends on this. The picture quality should be as good as possible, given fulfillment of the above requirements. What is desired is a transcoding algorithm that presents a sensible compromise between the best possible picture quality, the least possible complication, and the shortest possible delay time.

A known embodiment of a digital transcoder is disclosed in the article cited in the introduction, "*Transcoder Architecture for Video Coding*," on page 3, in connection with the block diagram shown there. This block diagram illustration is reproduced in FIG. 2. The known transcoder 4 consists of a recurrent circuit of a complete MPEG-2 video decoder 10 and a complete MPEG-2 video coder 20. The MPEG-2 video decoder 10 has a series circuit that includes an input buffer 11, a variable length code (VLC) decoder 12, a dequantizer 13, an inverse discrete cosine transformation (IDCT) stage 14, and a series-connected addition unit 15. The output signal of the addition stage 15 is conducted to one input of the adder 30 of the MPEG-2 video coder 20, and at the same time is conducted to a second input of the addition stage 15 at a picture memory 16 with series-connected motion compensation stage 17.

Figure 2:
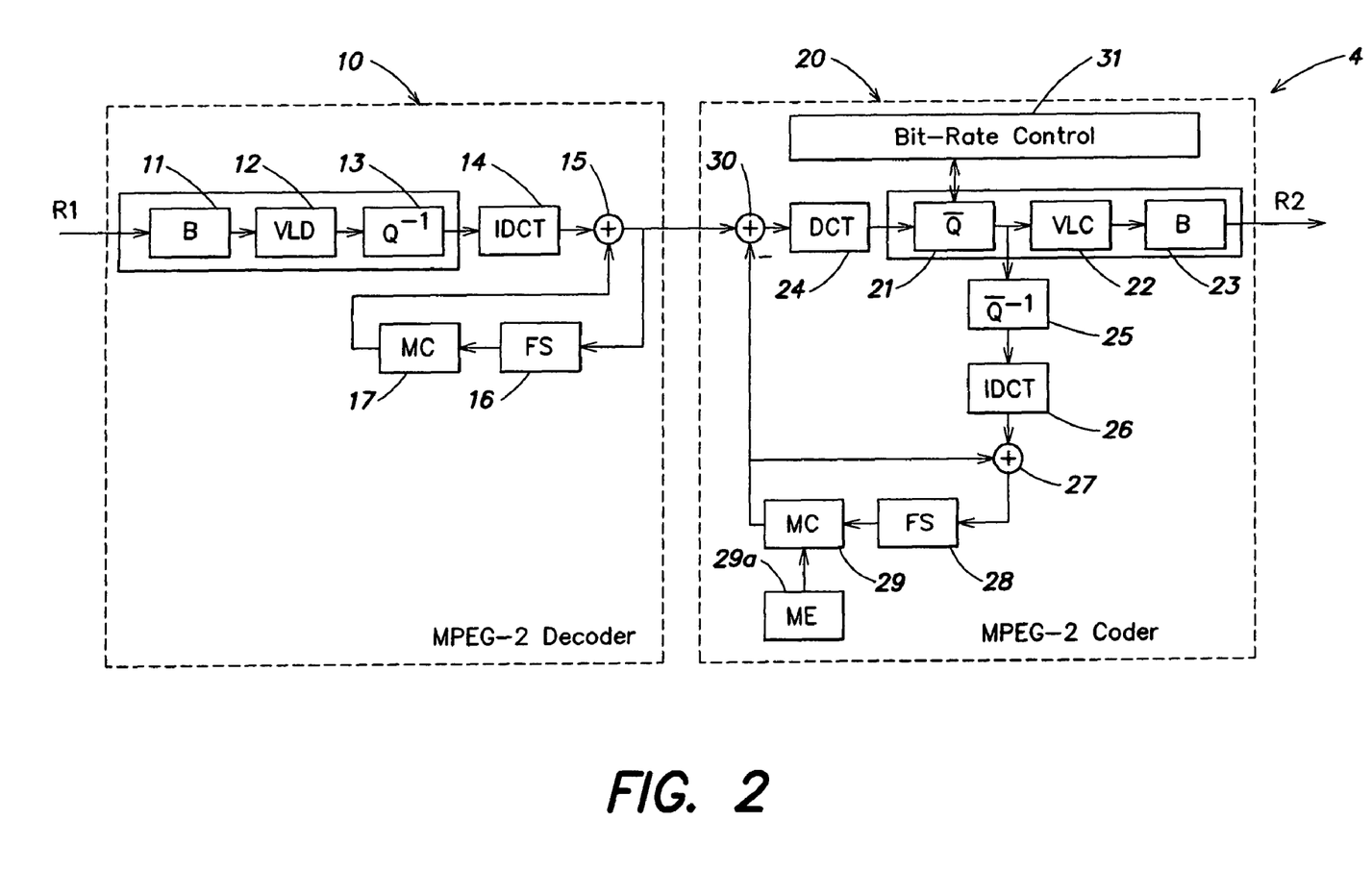
FIG. 2 is a block diagram illustration of a known digital transcoder.

The MPEG-2 video coder 20 has a series circuit that includes a DCT stage 24, a subsequent quantizer 21 with a series-connected VLC coder 22, and an output buffer 23. The output of the quantizer 21 is connected to the input of a dequantizer 25, to whose output another IDCT stage 26 is connected. The output of the latter is connected to the input of an addition stage 27. The output of the addition stage 27 is fed back, via a picture memory 28 with a series-connected motion compensation stage 29, to a second input of the addition stage, and also to a second input of the adder 30. Furthermore, a motion estimation stage 29a is coupled to the motion compensation stage 29.

The input video bit stream is completely decoded by such a known digital transcoder, and subsequently is completely recoded. A bit-rate control stage 31 of the MPEG-2 coder 20 adjusts the quantizer 21 in such a way that the desired low constant target bit rate is achieved.

Such a transcoder fulfills the above requirements for the functions of the desired transcoder, but its implementation is too complex. The multiple calculations of the DCT and IDCT, the motion compensation, and especially of the motion estimation creates a complexity that is too great for a reasonable cost hardware realization. The memory requirements are also too large since two pictures must always be stored to implement the motion compensation.

One reason for the complexity of the general transcoder is the lack of communication between the decoder and the coder. The coder cannot access the coding parameters of the input bit stream, which are present in the decoder, and must decide all the coding parameters anew. In particular, the coder must make a new estimate of the motion.

The complexity and expense of the general transcoder can be reduced if not all of the coding parameters must be decided anew and if the appropriate parameters of the input bit stream are utilized. Depending on the number and choice of the coding parameters taken over from the input bit stream, simplified transcoders will result.

A known, simplified digital transcoder, without the feedback shown in FIG. 2 is known, e.g., from FIG. 2 on page 411 of the above-cited publication, "*Rate Conversion of MPEG Coded Video by Requantization Process.*" An adaptive requantization and bit-rate control is established by the new requantization factor being determined as the product of basis quantization factors and the quotient of the input quantization factors and the average input quantization factors.

This is problematical, because the quantization factors must be related to the corresponding, large data quantities.

Therefore, there is a need for an improved digital transcoding system.

SUMMARY OF THE INVENTION

An object of the present invention is to improve the above-cited digital transcoder without feedback in such a way that it can be realized simply and without a great deal of memory.

A digital transcoder system is presented for receiving data bit streams with a first bit rate (R1) and outputting a data bit stream with a second bit rate (R2) which differs from the first bit rate (R1), and in particular is reduced relative thereto. This transcoder system has a decoder device (10) on its input side and a coder device (20) on its output side. The coder device includes a series circuit of a quantizer (21) for requantizing the data dequantized in the decoder device (10), with a requantization factor (Q2), also with a subsequent VLC coder (22) and an output buffer (23). Establishing the second bit rate (R2) requires that the requantization factor of the quantizer (21) be changed, with reference to macro-blocks, according to the specification of a certain calculational formula.

This and other objects, features and advantages of the present invention will become more apparent in light of the following detailed description of preferred embodiments thereof, as illustrated in the accompanying drawings.

DETAILED DESCRIPTION OF THE INVENTION

Figure 3:
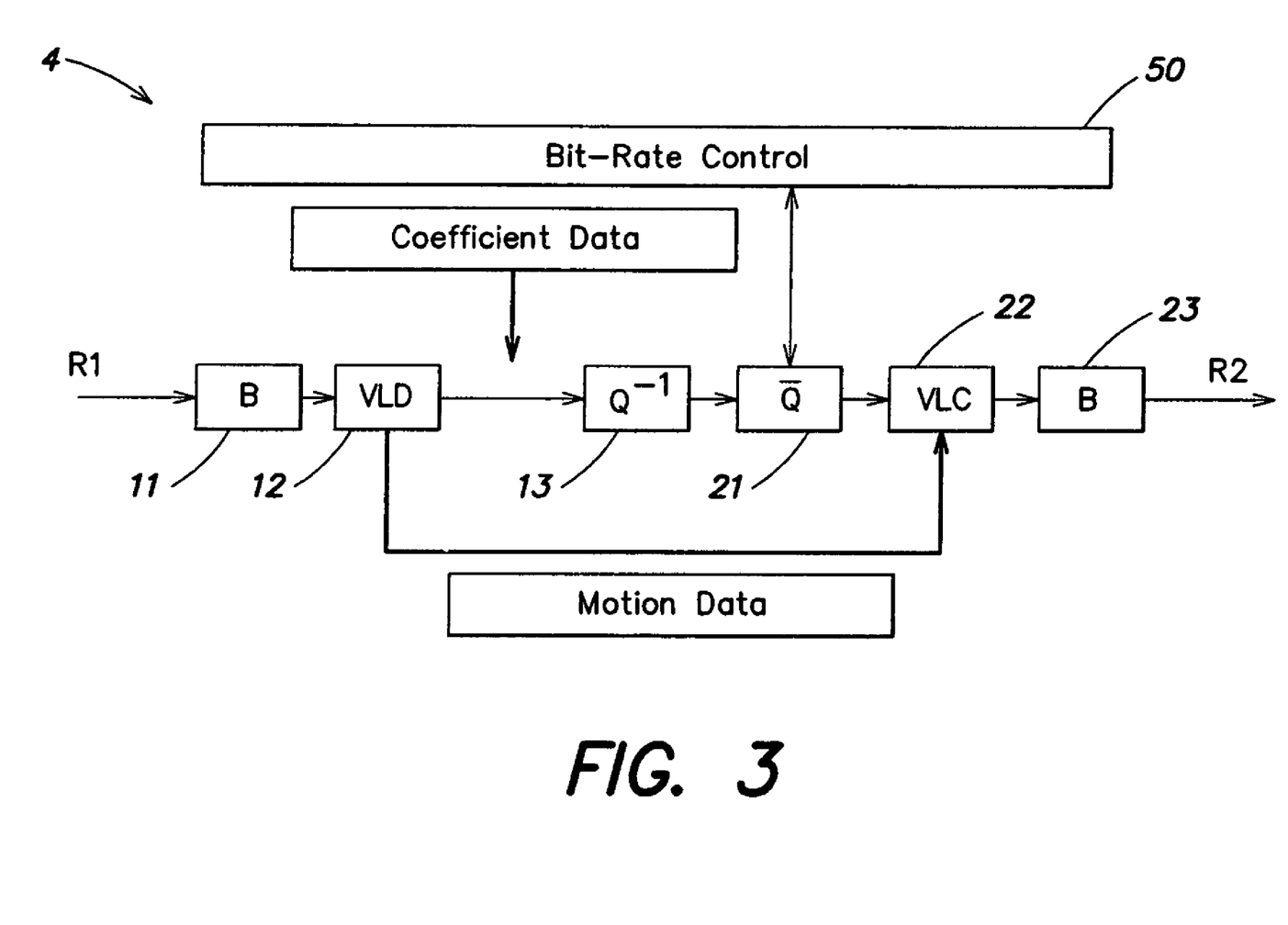
FIG. 3 is a block diagram illustration of an embodiment of a digital transcoder according to the present invention.

FIG. 3 is a block diagram illustration of an embodiment of a digital transcoder without feedback, in accordance with the present invention. A first data bit stream R1 is input to an input buffer 11 of the transcoder 4. This input buffer 11 serves as an intermediate memory of a section of the data bit stream R1. On the output side, the input buffer 11 is connected to a VLD decoder and demultiplexer 12, whose output is connected to a dequantizer 13. The output of the dequantizer 13 is connected directly to a quantizer 21, whose output is connected to a VLC coder 22. On its output side, the digital transcoder 4 also has an output buffer 23. A second data bit stream R2 is tapped from the output of the output buffer 23. In comparison to the input data bit stream R1, for example, the data bit stream R2 has a reduced bit rate and is constant, while the received bit stream R1 may have a variable bit rate.

The motion data in the VLC decoder and demultiplexer 12 are applied to the VLC coder 22 directly and unchanged. The quantizer 21 is connected to a bit-rate control stage 50, which ensures the data bit stream R2 is output at a prescribed, constant target bit rate.

Before discussing the detailed circuit block diagram of an embodiment of the inventive digital transcoder, the functioning of the transcoder without feedback (shown in FIG. 3) will be discussed.

The extent of the coefficient data depends on the selected quantization. A coarse quantization with a large quantization factor reduces the data quantity of the coefficients, since many coefficients are quantized to zero, i.e., are deleted, and the remaining coefficients become relatively small. A few small coefficients can be coded efficiently in the VLC unit, and result in a small data quantity.

The high-rate input bit stream R1 contains finely quantized coefficients. The finely quantized coefficients are quantized more coarsely in the requantization process. This reduces the data quantities of the coefficients and the bit rate of the transcoded bit stream. If the requantization factor is sufficiently large, all the coefficients vanish. This special case is detected in the transcoding process and is handled according to the MPEG-2 standard in a well-known fashion.

The bit-rate control stage 50 in the transcoder 4 makes sure that the transcoded bit stream fulfills the desired requirements for the average and maximum bit rates and for the bit-rate characteristic. The requantization factor is the sole instrument of control. Every bit-rate control in a transcoder has a delay time. This property shall be explained by a general model of a bit-rate control. The bit-rate control reads a segment of the input bit stream, and the data quantity of the coefficients per picture and the quantization factors in the input bit stream are analyzed. Following the analysis, which corresponds to the stored segment of the input bit stream, the stored coefficient data is requantized. Since the control in the transcoder should have a short delay time, only a small segment of the input bit stream may be put into intermediate storage for analysis. To reduce the delay time, the control in the transcoder dispenses with storage and analysis of the input bit stream. It consequently operates on a macro-block basis. A macro-block is a data region in the MPEG-2 video bit stream that contains the coefficient data and the motion data of only a 16×16 pixel picture section. A macro-block is read in from the input bit stream, requantized without delay, and written into the transcoded output bit stream.

Since the bit-rate control does not pre-analyze the input bit stream, it orients the specification of the requantization factors in terms of the data quantity of the already transcoded bit stream and the most recently used requantization factors. Sensible estimates must be made for some adjustment parameters of the control, which are unknown due to the lack of a pre-analysis. Such estimates are suitably based on empirical and statistical considerations.

The bit-rate control converts, as necessary, an input bit stream with a variable bit rate (VBR) bit stream into a transcoded bit stream with a constant bit rate (CBR) bit stream. The video bit streams on the DVD video generally are VBR bit streams. VBR bit streams markedly differ from CBR bit streams in several points. As the name already expresses, VBR bit streams have a time-variable bit rate. For example, the bandwidth needed to transmit a VBR bit stream varies with time. In contrast, a CBR bit stream requires the same bandwidth at all times since the bit rate is constant over time. The bit-rate characteristic is reflected in the data quantity per picture. A VBR bit stream has a strongly varying data quantity per picture. Simple pictures with little activity (e.g., black and white pictures) generate a very small data quantity, while complicated pictures with great activity (e.g., sport recordings with fast motion) contain a very large data quantity. In a VBR bit stream, each picture has assigned to it the data quantity that will make very good picture quality possible. Consequently, the picture quality of VBR bit streams is generally constant over time and is always at a high level. A CBR bit stream is subject to the restriction that it must have the same bit rate at every moment. The data quantity per picture can vary only within boundaries such that a constant bit rate is still maintained. As a consequence, simple pictures must be coded with a relatively large data quantity, and complicated pictures with a relatively small data quantity. The bit-rate control of the inventive transcoder 4 takes into account the above-mentioned properties of the VBR input bit stream, and it generates a transcoded bit stream which satisfies the CBR properties.

Figure 4:
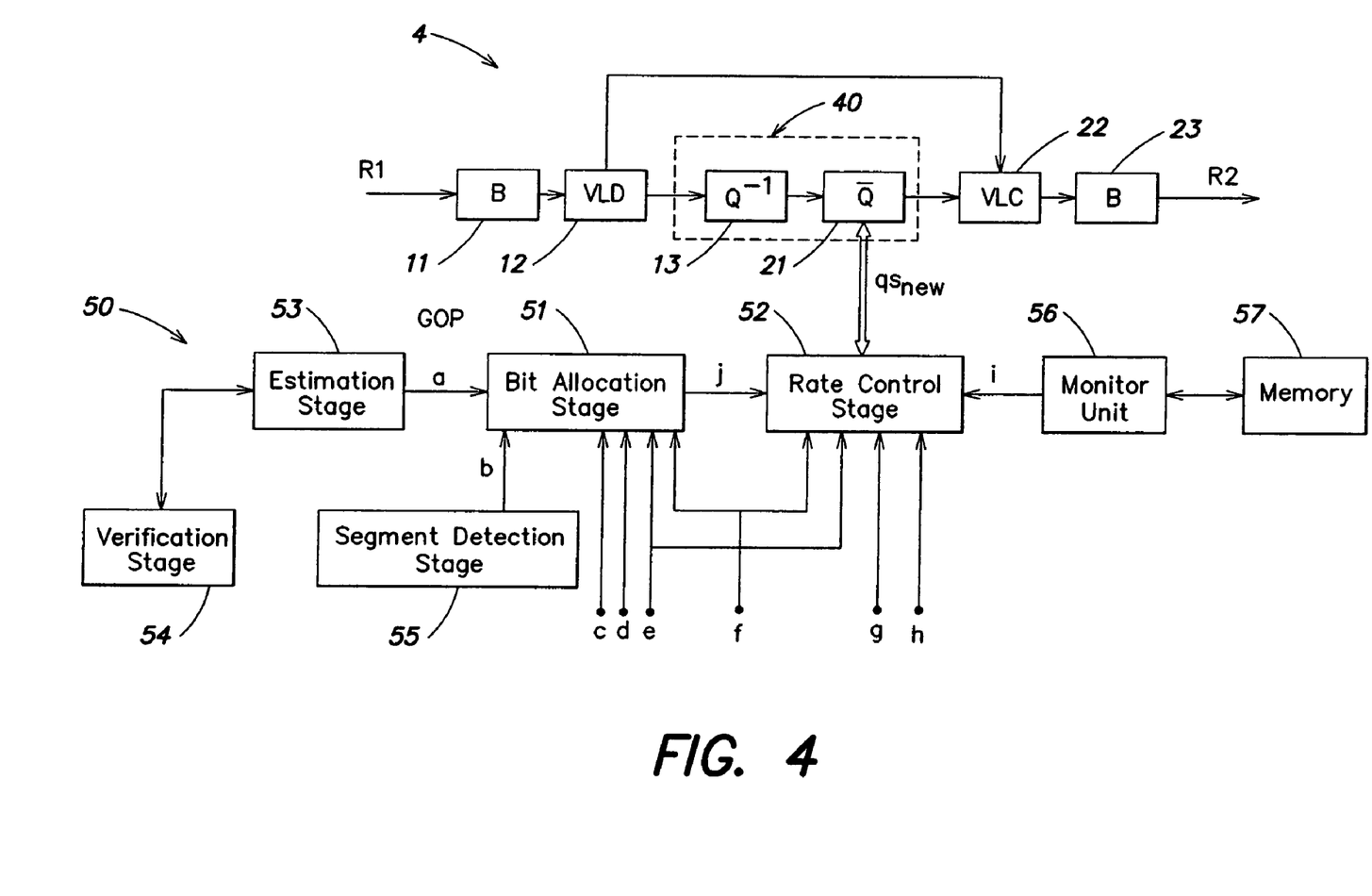
FIG. 4 is a more detailed illustration of the digital transcoder illustrated in FIG. 3.

FIG. 4 is a more detailed illustration of the digital transcoder illustrated in FIG. 3. The bit-rate control stage 50 includes of a series of circuit blocks 51-57, that receive adjustment parameters (a) to (j) to regulate the requantization factor in the quantization stage 21 in such a way that the output data bit stream R2 has a previously specified, constant target bit rate.

The bit-rate control stage 50 has a bit allocation stage 51 to determine the target data quantity for a picture. This stage 51 is connected to an estimation stage 53, which provides to the bit allocation stage 51 the estimated adjustment parameters for picture groups (GOP). The estimated values can include, for example, the GOP length and/or the GOP structure. A verification unit 54 is coupled to the estimation stage 53 and verifies the estimates by the information in the received data bit stream R1. A segment detection stage 55 furnishes another adjustment parameter signal b to the bit allocation stage 51. This segment detection stage 55 detects picture and scene segments. As further signals, the bit allocation stage 51 receives information about the number of bits generated in the transcoding of the last picture (signal c) and information about the average value of the requantization factors of the last picture (signal d). The bit allocation stage 51 also receives information about the target bit rate (signal e) and the picture refresh frequency (signal f).

From the signals a through f, the bit allocation stage 51 creates a signal j for the target data quantity of a picture, and conducts this to a rate control stage 52. The rate control stage 52 is connected directly to the quantizer 21 of the transcoder 4, and makes available to the quantizer 21 the requantization factors for each macro-block in the picture. For this purpose, the rate control stage 52 receives not only the target data quantity j, but also information about the picture refresh frequency and the target bit rate (signals e and f respectively). Furthermore, the rate control stage 52 receives an information signal g about the number of macro-blocks per picture, and an information signal about the number of bits generated in the transcoding of the individual macro-blocks (signal h). The rate control stage 52 also receives a signal i from a monitor unit 56, which is connected to a video buffering verifier (VBV) memory 57. The signal i indicates that the VBV memory 57 has neither overflowed nor run empty. The bit allocation stage 51 also receives estimated values for the GOP length and for the structure of a picture group (GOP structure). This is necessary so the bit allocation stage 51 can calculate a sensible value for the target data quantity of a picture.

Figure 9:
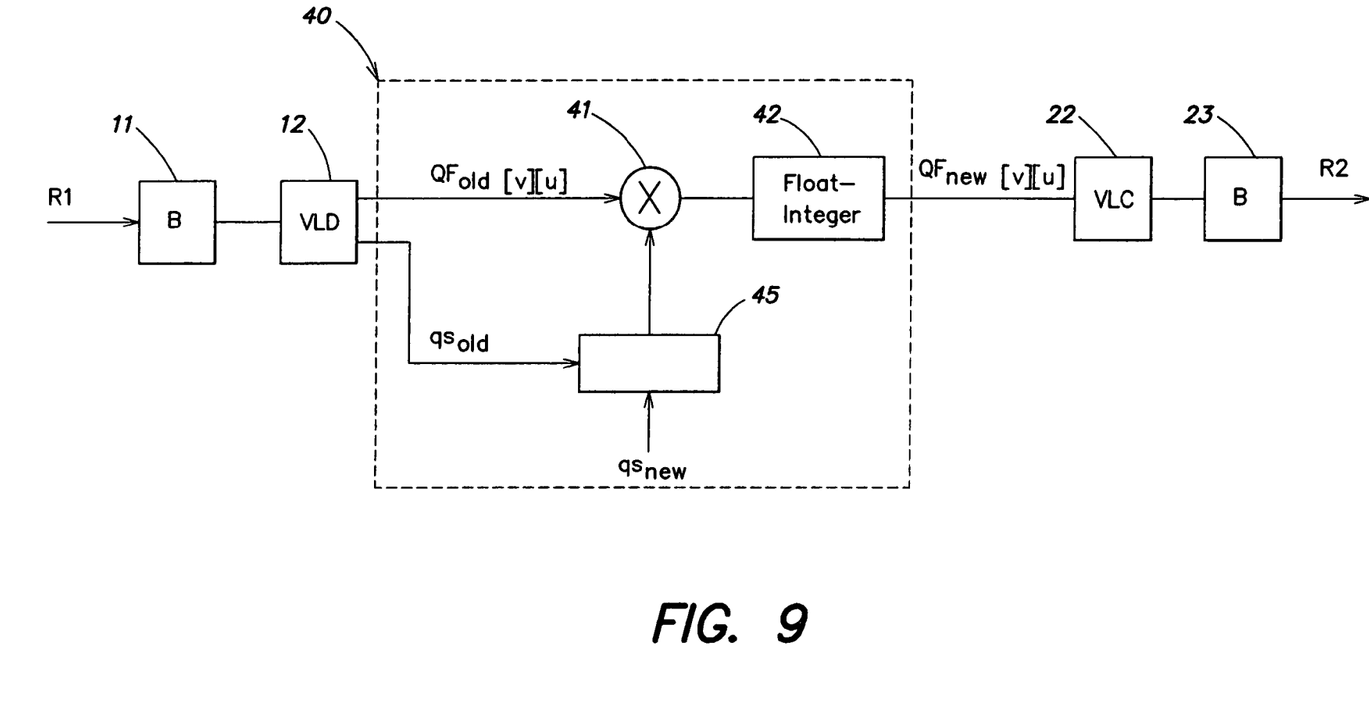
FIG. 9 is a block diagram illustration of a system to realize a stage of a transcoder, by which the dequantization and quantization process can be implemented in one step.

As already indicated by dashes in the block circuit diagram of FIG. 4, the dequantizer 13 and the quantizer 21 can be replaced by a common stage 40. An example of a common stage 40 is illustrated in FIG. 9. The common stage 40 includes a multiplier 41, to which the VLD decoder and demultiplexer 12 supplies the coefficient data $QF_{old}$ and the result of dividing the old requantization factors $qs_{old}$ by the new requantization factors $qs_{new}$. The division of $qs_{old}$ over $qs_{new}$ is performed in a divider 45. The new requantization factors $qs_{new}$ are made available via the bit control stage 50 or manually, as explained in connection with FIG. 4. The old requantization factor $qs_{old}$ is conducted from the VLD decoder and demultiplexer 12 to the divider 45. The output of the multiplier 41 is connected to a float integer conversion stage 42. The new coefficient data $QF_{new}$ are produced by the float integer conversion stage 42 and input to the VLC coder 22.

As a result of this circuit arrangement, the quantization and requantization factors are not determined independently of one another in two steps, but rather jointly in one step. The quantization of the DCT coefficients, that is the coefficient data, is determined by the quantization matrix and the quantization factor qs. The quantization matrix contains one value for each of the 64 DCT coefficients of a block. The quantization factor QS is constant for all blocks, and thus also for all coefficients of a macro-block. A characteristic of the inventive requantization process is that the quantization matrix is not changed. The transcoded bit stream contains the same quantization matrix as the input bit stream R1. Since the quantization matrix remains unchanged, the requantization formula, according to $$QF_{new}[v][u] = QF_{old}[v][u] \cdot \frac{qs_{old}}{qs_{new}},$$

contains no elements of the quantization matrices. Since the quotient $qs_{old}/qs_{new}$ is constant for all DCT coefficients of a macro-block, it consequently needs to be calculated only once per macro-block and, even then, only if $qs_{old}$ or $qs_{new}$ have changed compared to the preceding macro-block. The new coefficient data $QS_{new}$ is calculated merely by multiplying the quotient $qs_{old}/qs_{new}$ by the old coefficient data $QF_{old}$. Advantageously, the multiplication must be performed only if $QF_{old}$ is not equal to zero.

The full utility of the above requantization formula appears when the calculational complication is reduced for a hardware realization of the invention. The above requantization formula requires at most only one division per macro-block, and at most one multiplication per DCT coefficient.

Figure 10:
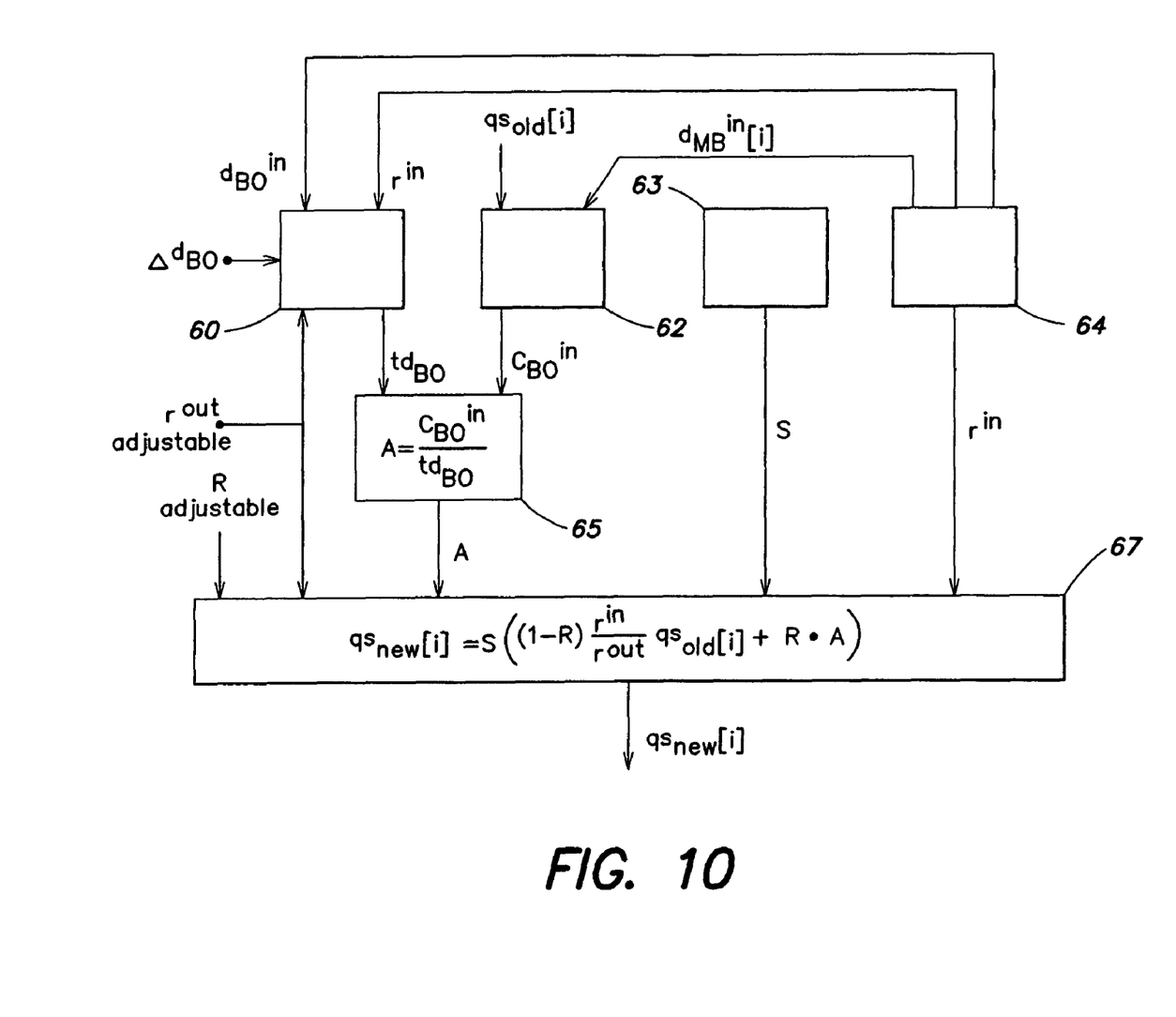
FIG. 10 is a block diagram illustration with various circuit blocks to calculate the new requantization factors $qs_{new}$.

FIG. 10 illustrates a block diagram of a circuit for calculating the new requantization factors $qs_{new}$. This type of calculation can be used in every transcoder (that is also in the previously known transcoders of FIGS. 2 and 3) and thus is independent of the circuit arrangement for determining the DCT coefficients. However, the block circuit diagram of FIG. 10 preferably is used in combination with the arrangement of FIG. 9.

The block circuit diagram of FIG. 10 includes various calculational stages 60-67, to which various calculational parameters are respectively conducted. To understand the manner of the calculation, the theoretical background of its implementation will first be discussed.

The bit-rate control for a transcoder is based on the complexity measure, called "complexity" for short. The following complexities must be distinguished:

Complexity of a macro-block in the bit stream that is being transcoded $$c_{MB}{}^{in}[i] = d_{MB}{}^{in}[i] \cdot qs_{MB}{}^{in}[i]$$

Complexity of a slice (macro-block group) in the bit stream being transcoded $$C_{slice}^{in} \sum_{all\ MBi\ in\ slice} C_{MB}^{in}[i]$$

Complexity of a picture in the bit stream being transcoded $$C_{picture}^{in} = \sum_{all\ MBi\ in\ picture} C_{MB}^{in}[i]$$

Complexity of a group of pictures (GOP, picture group) in the bit stream being transcoded $$C_{GOP}^{in} = \sum_{all\ MBi\ in\ GOP} C_{MB}^{in}[i]$$

Upper indices "in" and "out" here characterize the input bit stream being transcoded and the transcoded output bit stream.

The index "i" characterizes the individual macro-blocks. Further definitions of symbols:

| | |
|---|---|
| C: | Complexity |
| $d_{MB}{}^{in}[i]$: | Data quantity in bits, of the ith macro-block in the input stream |
| $qs_{old}[i]$: | Quantization factor of the ith macro-block in the input bit stream. |

The control determines the requantization factor $qs_{new}[i]$ for each macro-block.
Other important variables are:

| | |
|---|---|
| Target data quantity for a transcoded macro-block | $td_{MB}[i]$ |
| Target data quantity for a transcoded slice | $td_{slice}$ |
| Target data quantity for a transcoded picture | $td_{picture}$ |
| Target data quantity for a transcoded GOP | $td_{GOP}$ |

The target data quantity here is the data quantity which a macro-block, slice, picture, or a GOP is to possess in the transcoded bit stream after transcoding with the requantization factor determined by the control.

For the sake of simple notation, the following is agreed for the further discussion:

The index "BO" (reference object) stands for slice, picture, or GOP. It is thus understood that the following equations apply to various reference objects BO and that the control can be realized for various reference objects BO. In the following equations, BO always stands only for the same reference object, that is slice, picture, or GOP.

The bit-rate control needs memory space for pre-analyzing the bit stream that is being transcoded. Consequently, the control will have a delay time. According to the invention, the pre-analysis determines the following variables in the partly stored input bit stream:

| | |
|---|---|
| $d_{MB}{}^{in}[i]$: | Data quantity in bits of the ith macro-block in the input bit stream being transcoded |
| $d_{BO}{}^{in}$: | Data quantity in bits of a reference object in the bit stream being transcoded |
| $qs_{MB}{}^{in}[i]$: | Quantization factor of the ith macro-block in the input bit stream |

As another input variable, the bit-rate control needs the bit rate $r^{in}$ of the input bit stream. To determine this bit rate $r^{in}$, a segment of the input bit stream is stored. This segment extends from one intra-picture (including this I-picture) to the next following intra-picture (exclusive of this I-picture). The bit rate $r^{in}$ is thus determined on a GOP basis.

$$r^{in} = \frac{\text{total stored data quantity}}{\text{total number of stored pictures}} \cdot \text{picture refresh frequency}$$

The object of the bit-rate control is that the transcoded output bit stream should have a constant bit rate $r^{out}$ (=target bit rate) regardless whether the input bit rate $R^{in}$ is constant or variable. The process of the control here is as follows:

First Step:
Calculation of the target data quantity $td_{BO}$ for each reference object according to $$td_{BO} = \frac{r^{out}}{r^{in}} \cdot d_{BO}^{in} - \Delta d_{BO},$$

where $\Delta d_{BO}$ is the deviation of the actually generated data quantity $d_{BO}^{in}$ in bits for the preceding reference object from the target data quantity $td_{BO}$, that is $$\Delta d_{BO} > 0, \text{ when } d_{BO}^{out} > td_{BO}$$

$$\Delta d_{BO} < 0, \text{ when } d_{BO}^{out} < td_{BO}$$

Second Step:
Calculation of a correction term A for the quantization factors in the reference object BO:

$$A = \frac{C_{BO}^{in}}{td_{BO}}$$

where $$C_{BO}^{in} = \sum_{all\ MBi\ in\ Macroblock} C_{MB}^{in}[i]$$

Third Step:
Calculation of the requantization factors $qs_{new}$ for all macro-blocks, according to $$qs_{new}[i] = S \cdot \left( (1-R) \frac{r^{in}}{r^{out}} qs_{old}[i] + R \cdot A \right)$$

The factor $r^{in}/r^{out}$ implies the assumption that the complexity of a macro-block remains the same in the requantization/transcoding process, that is remains constant. This factor can possibly be omitted in calculating the requantization factors. R designates a weighting factor, and S a factor for avoiding overflow or emptying of the VBV memory. If overflow of the VBV memory appears imminent, the control inserts so-called stuffing bytes into the bit stream. S is a function that depends on the fill state of the VBV memory. In one example, the function for S can be linear. For a low fill state, this function delivers a value S>1.0 so as to increase $qs_{MB}^{in}[i]$. For a large fill state, this function delivers a value S<1.0, so as to reduce $qs_{MB}^{out}[i]$. S is updated after a picture or a macro-block has been transcoded (if the fill level should have exceeded or fallen below a specified level).

This leads to a circuit arrangement for calculating the requantization factors $qs_{new}$, as specified in FIG. 10. A central computing device 67 receives the prescribed factors R, A, and S as well as the bit rate $r^{in}$ of the received, i.e. input, data bit stream, also the desired output bit rate $r^{out}$. The computing device 67 from this determines the new requantization factors $qs_{new}$. The stage 65 determines A from the above formula. The output of stage 65 is connected to the computing device 67. The input of stage 65 receives the parameter $C_{BO}^{in}$ from stage 62 and the value $td_{BO}$ from stage 60. The stage 65 calculates the value of the correction factor A from the quotient $C_{BO}^{in}/td_{BO}$.

The stage 60 generates the value $td^{BO}$ from the variables $\Delta d_{BO}$, $d_{BO}^{in}$, $r^{in}$, and $r^{out}$, in accordance with the above calculational prescription, and it conducts this value to stage 65. The values $d_{BO}^{in}$ and $r^{in}$ are provided by stage 64. Furthermore, stage 64 provides the value $d_{MB}^{in}[i]$ to stage 62, and the value $r^{in}$ to the computing device 67. The old requantization factors $qs_{old}[i]$ are also input variables for stage 62, and it outputs the value $C_{BO}^{in}$ to stage 65. Finally, the correction factor S is conducted from stage 63 to the computing device 67.

The transcoding algorithm for the transcoder with bit-rate control was developed and investigated in accordance with the above explanations. The functionality of the algorithm will be shown by way of an example. The known picture test sequence called "Susie" (this test sequence shows a woman with a telephone) has a resolution of 720×576 pixels and a picture refresh frequency of 25 Hz. An MPEG-2 coder was configured so that from this it generates a video bit stream with an average bit rate of 6 Mbit/s. This bit stream was conducted to the input of the inventive transcoder and was transcoded to 3 Mbit/s. The transcoded bit stream and the output of the inventive transcoder has, as desired, a constant bit rate. The chosen bit rates are typical for the given problem definition, but they can also be chosen differently. Although the DVD video permits a maximum bit rate of 9.8 Mbit/s, the average bit rate of the VBR bit streams amounts to only 6 Mbit/s or less. The inventive transcoder succeeds in reducing the data quantity by requantization with a coarse quantization factor.

Figure 5:
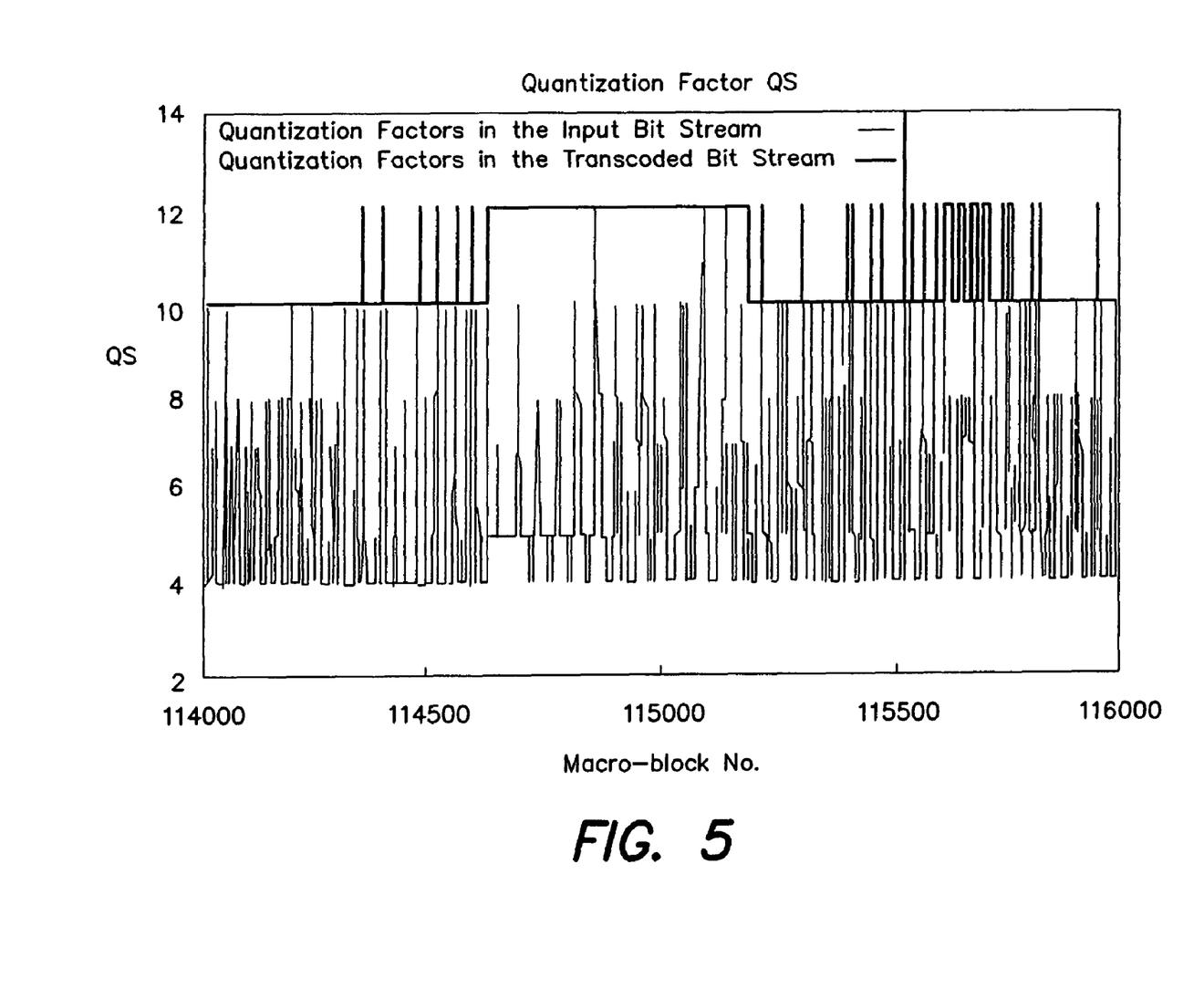
FIG. 5 is a diagram from which proceed the quantization factors QS in the input bit stream and in the transcoded bit stream, in connection with a specific embodiment of the digital transcoder of FIGS. 3 and 4.

FIG. 5 clarifies the requantization process. The quantization factor QS is plotted along the vertical axis of the diagram, light curve for the input bit stream, and heavy curve for the transcoded bit stream. The horizontal axis represents the progressive macro-blocks. It is apparent that the requantization process makes the quantization factors larger in the transcoded bit stream than in the input bit stream. The input bit stream contains relatively small quantization factors. To reduce the bit rate of the input bit stream from 6 Mbit/s to 3 Mbit/s, the requantization process increases the quantization factors. This corresponds to a coarser quantization. Consequently, the curve that represents the quantization factors in the transcoded bit stream is situated above the curve that represents the quantization factors in the input bit stream. The coarser quantization in the transcoded bit stream and thus the lower bit rate is reflected in the data quantity per picture.

Figure 6:
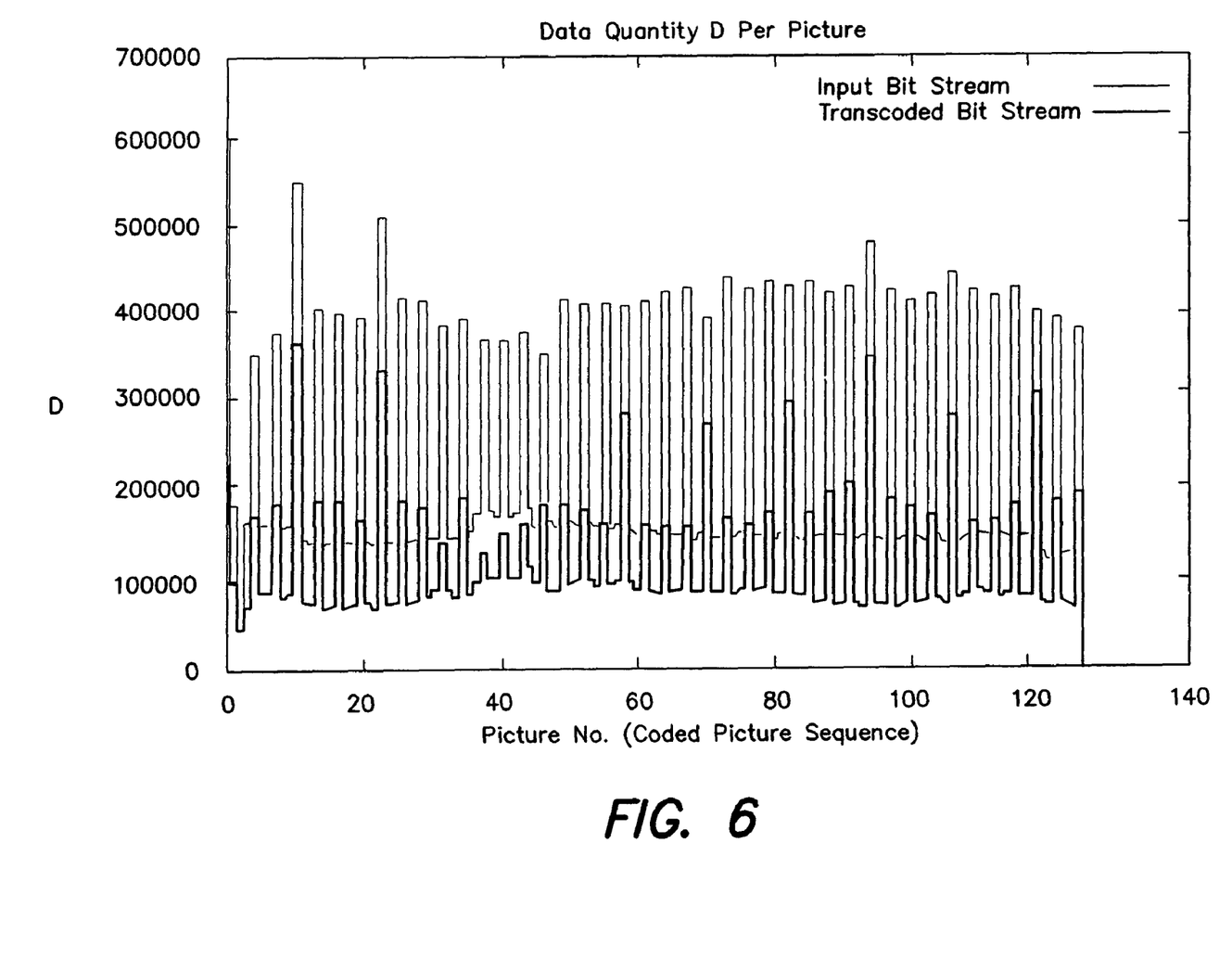
FIG. 6 is a diagram from which one can derive the data quantity D per picture in the input bit stream and in the transcoded bit stream, in connection with the given, specific embodiment.

FIG. 6 illustrates that the individual pictures have a smaller data quantity in the transcoded bit stream than in the higher-rate input bit stream. Due to its lesser bit rate, the transcoded bit stream also has a smaller data quantity per picture, as the heavy curve shows. The data quantity D per picture in the input bit stream and in the transcoded bit stream is plotted in the diagram shown here.

Figure 7:
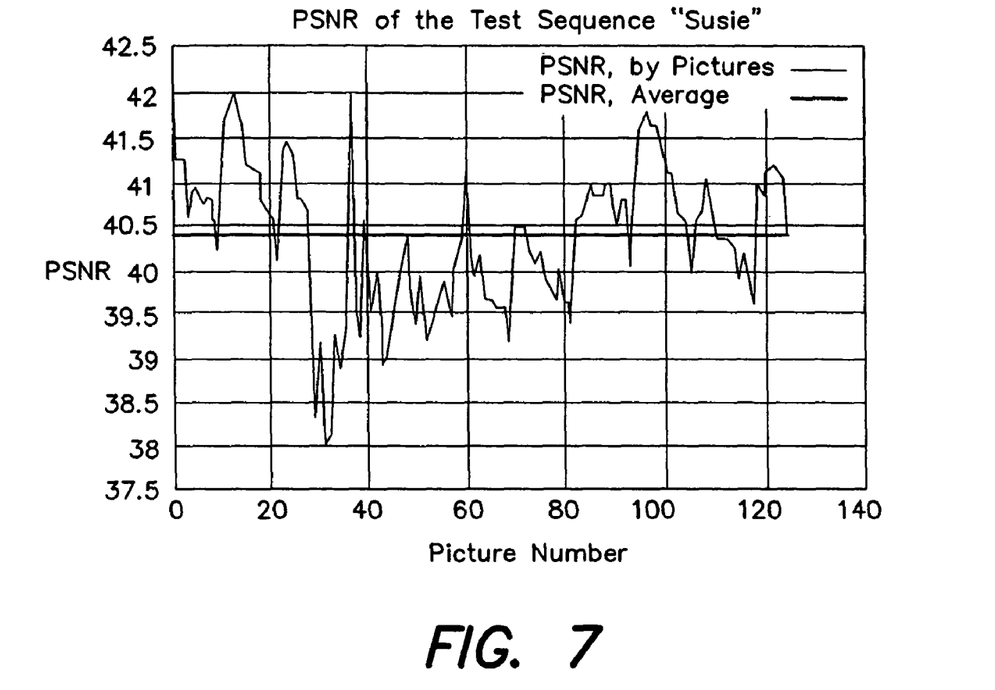
FIG. 7 is a plot of the "peak signal-to-noise ratio" (PSNR) of the picture generated by the inventive transcoder, as a measure of picture quality.

To evaluate the picture quality of the transcoded bit stream, the so-called "peak signal-to-noise ratio" (PSNR) is calculated. A larger PSNR generally represents a better picture quality. The PSNR of the transcoded bit stream of the example is shown in FIG. 7. Both the PSNR for each individual picture and the average value over the entire sequence are shown. The bit stream transcoded to 3 Mbit/s by the inventive transcoder has an average PSNR of 40.39 dB. To be able to evaluate this, the same input bit stream as above is transcoded to 3 Mbit/s by the general transcoder of FIG. 2, and the PSNR is calculated. The bit stream transcoded to 3 Mbit/s with the general transcoder has an average PSNR of 40.35 dB. The inventive transcoder thus provides approximately the same picture quality as the general transcoder. Significantly, the inventive transcoder, despite its lesser complexity and lesser memory requirements, provides nearly the same performance as the general transcoder and, has appeared, in some cases even better. The extremely high expense of implementing the transcoder of FIG. 2 thus can be avoided. The results of this example are representative and can be reproduced for other test sequences and bit rates.

The requirements for the inventive transcoder take into account its simplest possible implementation with a video processor. The above discussion has shown that the inventive transcoder not only fulfills this requirement but also provides a picture quality comparable to that of the very expensive transcoder of FIG. 2. Consequently, the inventive transcoder can be implemented by a video processor with little memory and e.g., in an optical bus system within a motor vehicle.

The input bit stream is written piece by piece into the input buffer 11. The VLD unit 12 decomposes the input bit stream R1 into its syntax elements, and for this purpose decodes the code words with variable length. Of the syntax elements, only those are processed further which designate coefficient data. By coefficient data are understood the picture points of all pictures, which have been transformed into the frequency range through the discrete cosine transformation (DCT). The coefficient data are dequantized ($Q^{-1}$) and then are subjected to the requantization process ($\overline{Q}$).0. The bit-rate controls the requantization factor so the transcoded bit stream at the output has the desired low, constant bit rate. The requantized coefficient data are converted into code words in the VLC unit 22. The VLC unit 22 likewise inserts the unchanged motion data from the input bit stream R1 into the transcoded bit stream. The complete transcoded bit stream is stored in the output buffer 23 and is outputted. The inventive transcoder has little complexity, since, in comparison with the general transcoder of FIG. 2, it performs no transformations (IDCT, DCT), no motion compensation (MC) in a feedback loop, and no motion estimate (ME). Since motion compensation is dispensed with, the inventive transcoder does not need a picture memory (FS). Its memory requirements thus are low. Its bit-rate control operates with a short delay time. Thus the inventive transcoder fulfills all requirements needed for successful implementation with a video processor.

Figure 8:
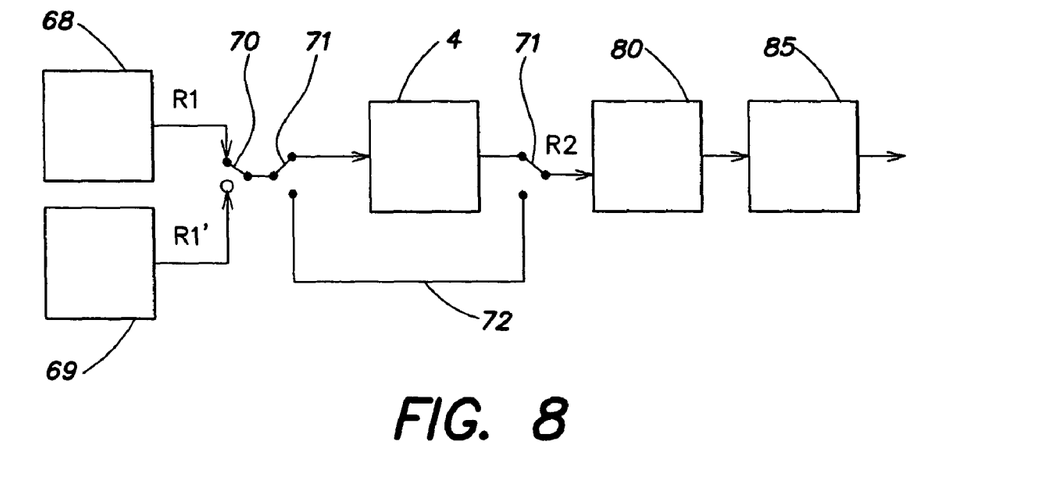
FIG. 8 is a block diagram illustration of a data recording device, which contains an embodiment of the inventive transcoder.

FIG. 8 is a block diagram illustration of a digital transcoder embodiment. The transcoder 4 is used in a digital video recording system to record digital data on a memory medium 80 with a data bit stream R2, having a constant bit rate that is independent of the bit rate of the received data bit stream R1. For this purpose, the input of the transcoder 4 is connected to a digital video source, e.g., a digital video disk 69 or a signal source 68, which furnishes a digital video broadcasting signal (DVBS, DVBC, DVBT). The appropriate signal source 68 or 69 can be selected through a switch 70. Through a switchover device 71, the signals from the signal sources 68 or 69 can be conducted to the memory medium 80, directly through a connection line 72, or they can be stored there with a reduced bit rate, if the switches of the switch-over device 71 are in the position shown in FIG. 8. In this switch position, the received data bit stream R1 or R1' is conducted through the transcoder 4, and is stored in the memory medium 80 with a reduced and constant bit rate. With the switch position shown in FIG. 8, a "longplay record function" can be achieved, since the memory medium 80 contains memory data with a reduced bit rate. The memory medium 80 can be, for example, a magnetic tape or a semiconductor memory. Its picture-taking or sound-recording time is thus significantly increased through the inventive transcoder 4.

An advantage of using the transcoder 4 for recording data is that a constant bit rate is present at the output of the transcoder 4, regardless whether the input data bit streams are variable or constant.

The output of the memory medium 80 can be connected to a decoder 85, e.g., an MPEG-2 decoder. Furthermore, it is possible to use the transcoder 4 in such a way that it executes a transcoding program in the record mode and a decoding program in the playback mode. This is possible under the control of a microprocessor.

Although the present invention has been shown and described with respect to several preferred embodiments thereof, various changes, omissions and additions to the form and detail thereof, may be made therein, without departing from the spirit and scope of the invention.

What is claimed is:

1. A system for transcoding input data with a first bit rate into output data with a second bit rate different than the first bit rate, the system comprising:
    a decoder that receives and decodes the input data to provide first DCT coefficient data $QF_{old}$;
    a common stage including a multiplier that multiplies the first DCT coefficient data $QF_{old}$ by a quantization factor quotient signal $qs_{old}/qs_{new}$ to provide an output signal indicative of second DCT coefficient data $QF_{new}$; and
    a coder that receives and codes the second DCT coefficient data $QF_{new}$, to provide the output data.

2. The system of claim 1, where the second bit rate of the output data provided by the coder is constant.

3. The system of claim 1, where the decoder comprises a variable length decoder, and where the coder comprises a variable length coder.

4. The system of claim 1, where the common stage comprises a divider that receives first requantization factors $qs_{old}$ from the decoder and second requantization factors $qs_{new}$ from a bit-rate controller, and where the divider divides the first requantization factors $qs_{old}$ by the second requantization factors $qs_{new}$ to provide the quantization factor quotient signal $qs_{old}/qs_{new}$.

5. The system of claim 1, where the common stage further comprises a float-integer stage that receives and processes the output signal from the multiplier to provide the second DCT coefficient data $QF_{new}$.

6. The system of claim 1, further comprising a bit-rate controller that includes a bit allocation stage and a rate control stage, where the bit allocation stage generates a signal j for a target data quantity of a picture, and where the rate control stage receives and processes the signal j from the bit allocation stage to generate requantization factors $qs_{new}$ for controlling the common stage.

7. A system for transcoding input data with a first bit rate into output data with a second bit rate different than the first bit rate, the system comprising:
    a decoder that receives and decodes the input data to provide decoded input data;
    a dequantizer that receives and dequantizes the decoded input data to provide dequantized output data;
    a quantizer that receives the dequantized output data, and requantizes the dequantized output data as a function of a quotient signal $qs_{old}/qs_{new}$ to provide requantized output data, where $qs_{old}$ is indicative of first quantization factors received from the decoder, and where $qs_{new}$ is indicative of second quantization factors received from a controller; and
    a coder that receives and codes the requantized output data to provide the output data.

8. The system of claim 7, where the second bit rate of the output data provided by the coder is constant.

9. The system of claim 7, where the decoder comprises a variable length decoder, and where the coder comprises a variable length coder.

10. The system of claim 9, where the decoded input data is indicative of first DCT coefficient data $QF_{old}$, and where the requantized output data is indicative of second DCT coefficient data $QF_{new}$.

11. The system of claim 7, where the controller comprises a bit allocation stage and a rate control stage, where the bit allocation stage generates a signal j for a target data quantity of a picture, and where the rate control stage receives and processes the signal j from the bit allocation stage to generate requantization factors $qs_{new}$ for controlling the quantizer.

12. A system for transcoding input data with a first bit rate into output data with a constant second bit rate is different than the first bit rate, the system comprising:
- a decoder that receives and decodes the input data to provide decoded input data;
- a dequantizer that receives and dequantizes the decoded input data to provide dequantized output data;
- a quantizer that receives the dequantized output data, and requantizes the dequantized output data to provide requantized output data; and
- a coder that receives and codes the requantized output data to provide the output data with the constant second bit rate.

13. The system of claim 12, where the decoder comprises a variable length decoder, and where the coder comprises a variable length coder.

14. The system of claim 13, where the decoded input data is indicative of first DCT coefficient data $QF_{old}$, and where the requantized output data is indicative of second DCT coefficient data $QF_{new}$.

15. The system of claim 12, further comprising a bit-rate controller that generates requantization factors $qs_{new}$, for controlling the quantizer.

16. The system of claim 15, where the controller includes a bit allocation stage and a rate control stage, where the bit allocation stage generates a signal j for a target data quantity of a picture, and where the rate control stage receives and processes the signal j from the bit allocation stage to generate the requantization factors $qs_{new}$ for controlling the quantizer.

* * * * *

UNITED STATES PATENT AND TRADEMARK OFFICE
CERTIFICATE OF CORRECTION

| | | |
|---|---|---|
| PATENT NO. | : 7,936,816 B2 | Page 1 of 1 |
| APPLICATION NO. | : 11/519461 | |
| DATED | : May 3, 2011 | |
| INVENTOR(S) | : Sostawa et al. | |

It is certified that error appears in the above-identified patent and that said Letters Patent is hereby corrected as shown below:

On the Front Page
Please insert:

--Related Application Data (63) Continuation of application no. 09/672,293, filed on Sept. 27, 2000, now Pat. No. 7,106,799.--

Signed and Sealed this
Fourteenth Day of June, 2011

David J. Kappos
*Director of the United States Patent and Trademark Office*